US012632752B2

(12) United States Patent
Tristan et al.

(10) Patent No.: US 12,632,752 B2
(45) Date of Patent: May 19, 2026

(54) ENHANCED TECHNIQUES FOR BIAS ANALYSIS

(71) Applicant: Oracle International Corporation, Redwood City, CA (US)

(72) Inventors: Jean-Baptiste Frederic George Tristan, Burlington, MA (US); Michael Louis Wick, Lexington, MA (US); Stephen J. Green, Burlington, MA (US)

(73) Assignee: Oracle International Corporation, Redwood City, CA (US)

( * ) Notice: Subject to any disclaimer, the term of this patent is extended or adjusted under 35 U.S.C. 154(b) by 712 days.

(21) Appl. No.: 16/914,099

(22) Filed: Jun. 26, 2020

(65) Prior Publication Data

US 2021/0374582 A1     Dec. 2, 2021

Related U.S. Application Data

(60) Provisional application No. 63/032,676, filed on May 31, 2020.

(51) Int. Cl.
| | |
|---|---|
| *G06N 7/01* | (2023.01) |
| *G06F 16/2453* | (2019.01) |
| *G06F 16/2457* | (2019.01) |
| *G06N 20/00* | (2019.01) |

(52) U.S. Cl.
CPC ......... *G06N 7/01* (2023.01); *G06F 16/24545* (2019.01); *G06F 16/24578* (2019.01); *G06N 20/00* (2019.01)

(58) Field of Classification Search
CPC .. G06N 7/01; G06N 7/04; G06N 5/00; G06N 5/02; G06N 5/022; G06N 5/04; G06N 20/00; G06N 20/10
See application file for complete search history.

(56) References Cited

U.S. PATENT DOCUMENTS

| | | | |
|---|---|---|---|
| 7,720,720 | B1 | 5/2010 | Sharma et al. |
| 11,416,500 | B2 | 8/2022 | Tristan et al. |
| 11,775,863 | B2 | 10/2023 | Wick |

(Continued)

FOREIGN PATENT DOCUMENTS

WO     2020146028 A1     7/2020

OTHER PUBLICATIONS

Marin et al. "Importance sampling methods for Bayesian discrimination between embedded models", Oct. 2009 https://arxiv.org/pdf/0910.2325.pdf (Year: 2009).*

(Continued)

*Primary Examiner* — Kamran Afshar
*Assistant Examiner* — Lokesha Patel
(74) *Attorney, Agent, or Firm* — Robert C. Kowert; Kowert, Hood, Munyon, Rankin & Goetzel, P.C.

(57) ABSTRACT
A fairness metric of decisions pertaining to a plurality of candidates indicated in a data set is estimated. Using a Hamiltonian Monte Carlo sampling algorithm, sample sets corresponding to random variables of a null model and an alternate model are obtained. A respective kernel density estimator is fitted on at least some sample sets, and importance sampling is implemented on additional samples generated using the kernel density estimators. The estimated fairness metric is provided via one or more programmatic interfaces.

20 Claims, 8 Drawing Sheets

(56) References Cited

U.S. PATENT DOCUMENTS

| | | | |
|---|---|---|---|
| 2013/0086082 | A1 | 4/2013 | Park et al. |
| 2017/0206504 | A1 | 7/2017 | Taylor |
| 2018/0101885 | A1* | 4/2018 | Abhishek ............ G06F 16/9535 |
| 2020/0167512 | A1 | 5/2020 | Chitra |
| 2020/0293951 | A1 | 9/2020 | Johnston et al. |
| 2020/0349047 | A1* | 11/2020 | Faibish .................... G06N 3/08 |
| 2020/0372035 | A1 | 11/2020 | Tristan et al. |
| 2020/0372290 | A1 | 11/2020 | Tristan et al. |
| 2020/0372406 | A1 | 11/2020 | Wick |
| 2020/0372435 | A1 | 11/2020 | Kenthapadi |
| 2020/0372472 | A1 | 11/2020 | Kenthapadi |
| 2021/0049503 | A1 | 2/2021 | Nourian et al. |
| 2022/0036203 | A1 | 2/2022 | Nachum et al. |
| 2022/0156646 | A1 | 5/2022 | Farrar et al. |
| 2022/0382768 | A1 | 12/2022 | Tristan et al. |
| 2023/0394371 | A1 | 12/2023 | Wick |

OTHER PUBLICATIONS

Perrakis et al. "On the use of marginal posteriors in marginal likelihood estimation via importance sampling", Sep. 2014 https://www.sciencedirect.com/science/article/pii/S0167947314000814 (Year: 2014).*

Mullachery et al. "Bayesian Neural Networks", Jan. 2018 https://arxiv.org/ftp/arxiv/papers/1801/1801.07710.pdf (Year: 2018).*

Kamalov "Kernel density estimation based sampling for imbalanced class distribution", Feb. 2020 https://www.sciencedirect.com/science/article/pii/S0020025519309740 (Year: 2020).*

Wuest, T., Weimer, D., Irgens, C., & Thoben, K. D. (2016). Machine learning in manufacturing: advantages, challenges, and applications. Production & Manufacturing Research, 4(1), 23-45. (Year: 2016).*

Wu, J., Chen, X. Y., Zhang, H., Xiong, L. D., Lei, H., & Deng, S. H. (2019). Hyperparameter optimization for machine learning models based on Bayesian optimization. Journal of Electronic Science and Technology, 17(1), 26-40. (Year: 2019).*

Cynthia Dwork, et al., "Fairness Through Awareness", arXiv:1104.3913v2, Nov. 29, 2011, pp. 1-24.

Cynthia Rudin, et al., "The Age of Secrecy and Unfairness in Recidivism Prediction", Harvard Data Science Review 2.1, Published on Jan. 31, 2020, Updated on Mar. 31, 2020, pp. 1-55.

Muhammad Bilal Zafar, et al, "Fairness Constraints: Mechanisms for Fair Classification", arXiv:1507.05259v5, Mar. 23, 2017, In Proceedings of the 20th International Conference on Artificial Intelligence and Statistics (AISTATS) 2017, pp. 1-12.

Benjamin Fish, et al, "A Confidence-Based Approach for Balancing Fairness and Accuracy", arXiv:1601.05764v1, Jan. 21, 2016, pp. 1-10.

Jon Kleinberg, et al., "Inherent Trade-Offs in the Fair Determination of Risk Scores", arXiv:1609.05807v2, Nov. 17, 2016, pp. 1-23.

Sorelle A. Friedler, et al., "On the (im)possiblity of fairness*", arXiv:1609.07236v1, Sep. 23, 2016, pp. 1-16.

Alexandra Chouldechova, "Fair prediction with disparate impact: A study of bias in recidivism prediction instruments", arXiv:1610.07524v1, Oct. 24, 2016, pp. 1-6.

Muhammad Bilal Zafar, et al, Fairness Beyond Disparate Treatment & Disparate Impact: Learning Classification without Disparate Mistreatment:, arXiv:1610.08452v2, Mar. 8, 2017, pp. 1-10.

Sam Corbett-Davies, et al, "Algorithmic decision making and the cost of fairness", arXiv:1701.08230v4, Jun. 10, 2017, pp. 1-10.

Richard Berk, et al., "A Convex Framework for Fair Regression", arXiv:1706.02409v1, Jun. 7, 2017, pp. 1-15.

Maria-Florina Balcan, et al, "An Augmented PAC Model for Semi-Supervised Learning", 2006, pp. 61-89.

Aditya Krishna Menon, et al., "The Cost of Fairness in Binary Classification", Proceedings of Machine Learning Research 81, 2018, Conference of Fairness, Accountability, and Transparency, pp. 1-12.

Xuerui Wang, et al., "Topics over Time: A Non-Markov Continuous-Time Model of Topical Trends", KDD'06, Aug. 20-23, 2006, ACM, pp. 1-10.

Flavio Chierichetti et al, "Fair Clustering Through Fairlets" (31st Conference on Neural Information Processing Systems), dated 2017, pp. 1-9.

Hoda Heidari et al, "Fairness Behind a Veil of Ignorance: A Welfare Analysis for Automated Decision Making", (32nd Conference on Neural Information Processing Systems), dated 2018, pp. 1-12.

Toon Calders et al, "Three naive Bayes approaches for discrimination-free classification", dated 2010, pp. 277-292.

Cynthia Dwork et al, "Decoupled Classifiers for Group-Fair and Efficient Machine Learning", dated 2018, pp. 1-15.

Faisal Kamiran et al, "Data preprocessing techniques for classification without discrimination", dated Dec. 3, 2011, pp. 1-33.

Ehsan Kazemi et al, "Data Summarization with Privacy and Fairness Constraints", (Proceedings of the 35th International Conference on Machine Learning), dated 2018, pp. 1-10.

Junpei Komiyama et al, "Nonconvex Optimization for Regression with Fairness Constraints", (Proceedings of the 35th International Conference on Machine Learning), dated 2018, pp. 1-10.

Samira Samadi et al, "The Price of Fair PCS: One Extra Dimension", dated Oct. 31, 2018, pp. 1-19.

Michael Feldman et al., "Certifying and removing disparate impact", dated Jul. 16, 2015, pp. 1-28.

Matthew Joseph et al., "Fairness in Learning: Classic and Contextual Bandits", Nov. 7, 2016, pp. 1-28.

Thorsten Joachims et al., "Unbiased Learning-to-Rank with Biased Feedback", Aug. 16, 2016, pp. 1-10.

Hardt et al., "Equality of Opportunity in Supervised Learning", Oct. 7, 2016, pp. 1-22.

Ke Yang et al., "Measuring Fairness in Ranked Outputs", Oct. 26, 2016, pp. 1-5.

Shahin Jabbari et al., "Fairness in Reinforcement Learning", Aug. 6, 2017, pp. 1-23.

L. Elisa et al., "Ranking with Fairness Constraints", Jul. 30, 2018, pp. 1-32.

Sampath Kannan et al., "Fairness Incentives for Myopic Agents", May 5, 2017, pp. 1-23.

Meike Zehlike et al., "FA*IR: A Fair Top-k Ranking Algorithm", Jul. 2, 2018, pp. 1-10.

Danielle Ensign et al., "Runaway Feedback Loops in Predictive Policing", Dec. 22, 2017, pp. 1-12.

Muhammad Bilal Zafar et al., "From Parity to Preference-based Notions of Fairness in Classification", Nov. 28, 2017, pp. 1-14.

Amanda Bower et al., "Fair Pipelines", Jul. 3, 2017, pp. 1-5.

Cynthia Dwork et al., "Decoupled classifiers for fair and efficient machine learning", Jul. 20, 2017, pp. 1-20.

Michael Kearns et al., "Preventing Fairness Gerrymandering: Auditing and Learning for Subgroup Fairness", Dec. 3, 2018, pp. 1-34.

David Madras et al., "Predict Responsibly: Improving Fairness and Accuracy by Learning to Defer", Sep. 7, 2018, pp. 1-20.

Ursula Hebert-Johnson et al., "Calibration for the (Computationally-Identifiable) Masses", Mar. 16, 2018, pp. 1-40.

Abolfazl Asudeh et al., "Designing Fair Ranking Schemes", Jan. 4, 2018, pp. 1-16.

L. Elisa Celis et al., "Fair and Diverse DPP-based Data Summarization" Feb. 12, 2018, pp. 1-25.

Stephen Gillen et al., "Online Learning with an Unknown Fairness Metric", Sep. 18, 2018, pp. 1-27.

Ashudeep Singh et al., "Fairness of Exposure in Rankings", Oct. 17, 2018, pp. 1-10.

Michele Donini et al., "Empirical Risk Minimization Under Fairness Constraints", Jan. 31, 2020, pp. 1-17.

Alekh Agarwal et al., "A Reductions Approach to Fair Classification", Jul. 16, 2018, pp. 1-18.

Michael P. Kim et al., "Fairness Through Computationally-Bounded Awareness", Nov. 28, 2018, pp. 1-19.

Guy N. Rothblum et al., "Probably Approximately Metric-Fair Learning", Jul. 1, 2018, pp. 1-40.

Asia J. Biega et al., "Equity of Attention: Amortizing Individual Fairness in Rankings", May 4, 2018, pp. 1-10.

(56) References Cited

OTHER PUBLICATIONS

Meike Zehlike et al., "Reducing Disparate Exposure in Ranking: A Learning To Rank Approach", May 27, 2020, pp. 1-7.

Isabel Valera et al., "Enhancing the Accuracy and Fairness of Human Decision Making", May 25, 2018, pp. 1-11.

Nathan Kallus et al., "Residual Unfairness in Fair Machine Learning from Prejudiced Data", Jun. 7, 2018, pp. 1-14.

Niki Kilbertus et al., "Blind Justice: Fairness with Encrypted Sensitive Attributes", Jun. 8, 2018, pp. 1-15.

Tatsunori B. Hashimoto et al., "Fairness Without Demographics in Repeated Loss Minimization", Jul. 30, 2018, pp. 1-18.

Sam Corbett-Davies et al., "The Measure and Mismeasure of Fairness: A Critical Review of Fair Machine Learning", Aug. 14, 2018, pp. 1-25.

Goenner, "Discrimination and Mortgage Lending in Boston: The Effects of Model Uncertainty," 2010, The Journal of Real Estate Finance and Economics, vol. 40, pp. 260-285, 2010.

Radivojac, et al., "Feature Selection Filters based on the Permutation Test," Springer-Verlag Berlin Heidelberg 2004, European Conference on Machine Learning, pp. 334-346.

Geyik, et al, "Fairness-Aware Ranking in Serch & Recommendation Systems with Application to Linkedin Talent Search", May 21, 2019, arXiv: v1905.01989v2, pp. 1-11, 2019.

Rouder, et al, "Bayesian t tests for accepting and rejecting the null hypothesis," 2019, Psychonomic Bulleting & Review, vol. 15(2), pp. 225-237.

U.S. Appl. No. 16/781,945, filed Feb. 4, 2020. Michael Louis Wick et al.

U.S. Appl. No. 16/781,961, filed Feb. 4, 2020, Jean-Baptiste Frederic George Tristan et al.

U.S. Appl. No. 16/781,955, filed Feb. 4, 2020, Jean-Baptiste Frederic George Tristan et al.

N. Friel, et al., "Estimating the model evidence: a review", arXiv:1111.1957v1, Nov. 2011, pp. 1-21.

A. Mootoovaloo, et al., "Bayes Factors via Savage-Dickey Supermodels", arXiv:1609.02186v1, Sep. 7, 2016, pp. 1-24.

J. Mulder, et al., "A Generalization of the Savage-Dickey Density Ratio for Testing Equality and Order Constrained Hypotheses", arXiv:2004.09899v1, Apr. 21, 2020, pp. 1-15.

Andrew Gelman, et al., "Simulating Normalizing Constants: From Importance Sampling to Bridge Sampling to Path Sampling", Statistical Science 1998, vol. 13, No. 2, pp. 163-185.

Wikipedia, "Kernel density estimation", Retrieved from https://en.wikipedia.org/wiki/Kernel_density_estimation on, Jun. 19, 2020, pp. 1-13.

Matthew D. Hoffman, et al., "The No U-Turn Sampler: Adaptively Setting Path Lengths in Hamiltonian Monte Carlo", Journal of Machine Learning Research 15, 2014, pp. 1593-1623.

Michael G. Aamodt, et al., "Technical Advisory Committee Report on Best Practices in Adverse Impact Analyses", Published Sep. 2010, The Center for Corporate Equality, pp. 1-98.

Boring, et al., "Student evaluations of teaching (mostly) do not measure teaching effectiveness," 2016, ScienceOpen Research, 2016, pp. 1-11.

U.S. Appl. No. 18/590,285, filed Feb. 28, 2024, Tristan, et al.

Hunag, et al., "Riffled Independence for Ranked Data," 2009, Advances in Neural Information Processing Systems, vol. 22, pp. 1-9.

Prodinger, et al., "Unfair permutations," 2011, European Journal of Combinatorics, vol. 32, No. 8, pp. 1282-1298.

* cited by examiner

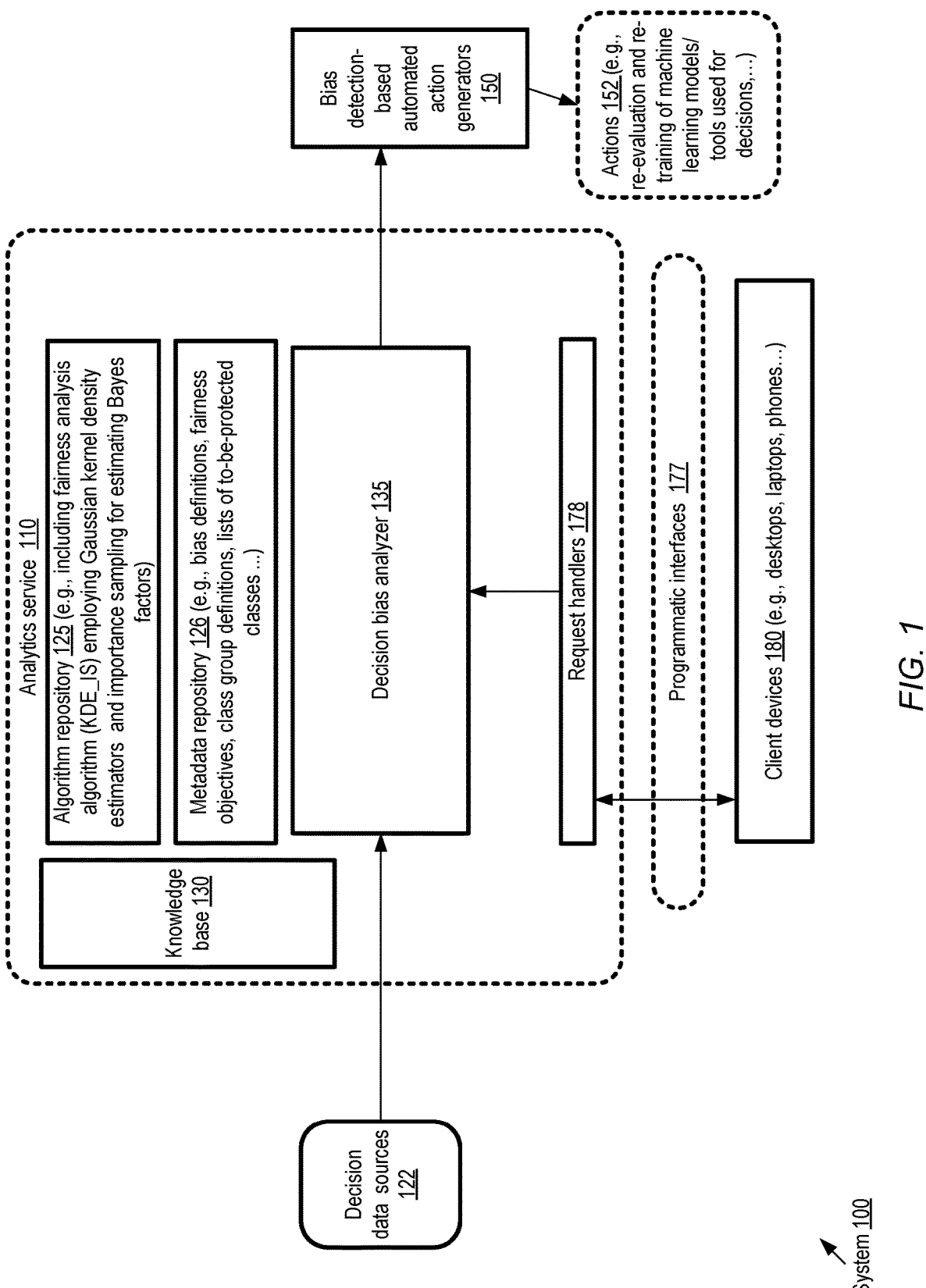

Bias detection-based automated action generators 150

Actions 152 (e.g., re-evaluation and re-training of machine learning models/ tools used for decisions,...)

Analytics service 110

Algorithm repository 125 (e.g., including fairness analysis algorithm (KDE_IS) employing Gaussian kernel density estimators and importance sampling for estimating Bayes factors)

Metadata repository 126 (e.g., bias definitions, fairness objectives, class group definitions, lists of to-be-protected classes ...)

Decision bias analyzer 135

Knowledge base 130

Request handlers 178

Programmatic interfaces 177

Client devices 180 (e.g., desktops, laptops, phones...)

Decision data sources 122

System 100

FIG. 1

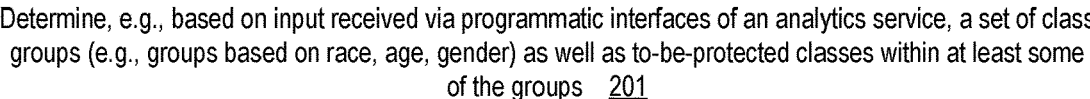

Determine, e.g., based on input received via programmatic interfaces of an analytics service, a set of class groups (e.g., groups based on race, age, gender) as well as to-be-protected classes within at least some of the groups   201

Determine target fairness objectives/criteria with respect to to-be-protected classes   204

Obtain data set DS indicating a plurality of decisions (e.g., selections for interviewing/hiring) made (for example with the help of machine learning models) with respect to a set of candidates over some time period; each candidate belongs to at least one class of each of the class groups   207

Bayes factor model generation:

Generate, e.g., based at least in part on the target fairness objectives and/or a set of heuristics, a respective set of random variables for (a) a null model and (b) an alternate model, where the null model represents a scenario in which the target fairness objectives are satisfied, and the alternate model represents a scenario in which at least some target fairness objectives are not satisfied   210

Bayes factor estimation:

Obtain, e.g., using No-U-Turn sampler or some other Hamiltonian Monte-Carlo sampling algorithm, sets of samples Samp1 from density functions corresponding to random variables included in the null model and the alternate model   213

Fit a respective Gaussian kernel density estimator (KDE) (e.g., with Scott smoothing) on the sets of samples   216

Obtain a larger set of samples Samp2 from the results of the KDEs, and perform importance sampling on Samp2 to compute final estimate for Bayes factor   219

Provide estimated Bayes factor as a fairness metric of the DS decisions to one or more destinations via programmatic interfaces (e.g., causing actions such as retraining of ML models used for the decisions) 222

*FIG. 2*

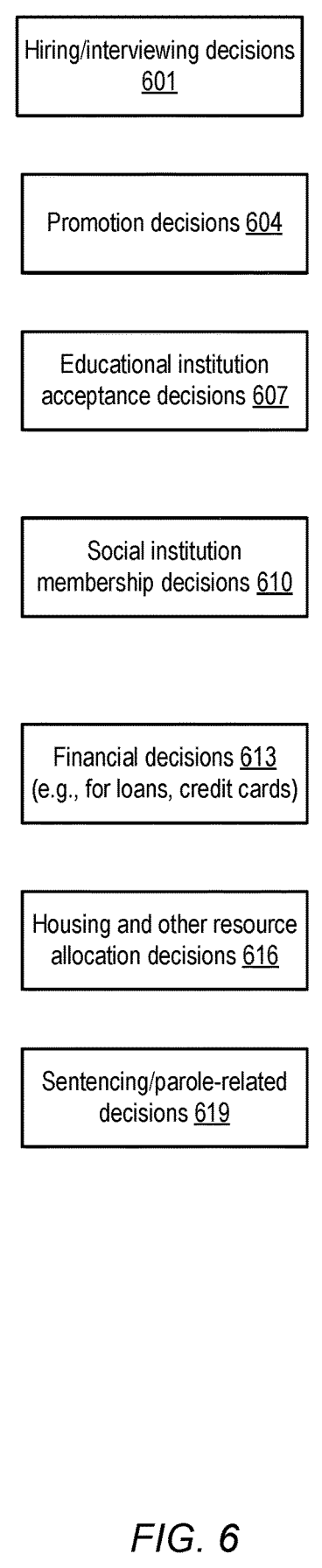

Hiring/interviewing decisions
601

Promotion decisions 604

Educational institution
acceptance decisions 607

Social institution
membership decisions 610

Financial decisions 613
(e.g., for loans, credit cards)

Housing and other resource
allocation decisions 616

Sentencing/parole-related
decisions 619

*FIG. 6*

ENHANCED TECHNIQUES FOR BIAS ANALYSIS

This application claims benefit of priority to U.S. Provisional Application No. 63/032,676 filed May 31, 2020, which is hereby incorporated by reference in its entirety.

BACKGROUND

Numerous types of important decisions are made every day based on automated analysis of a large combination of factors, often with the help of machine learning algorithms. For example, thousands of candidates from a variety of backgrounds, and with varying qualifications and life experiences, may submit resumes for a small number of jobs available at an organization. Only a few may be selected for interviews, and fewer still may be hired. Determining whether a set of choices, such as finance-related or hiring-related decisions made by business or government organizations, meet desired standards of fairness and impartiality towards affected individuals or groups is an important task and remains a non-trivial technical challenge.

SUMMARY

Various embodiments of systems, apparatus and methods for improved analysis and detection of potential biases in decision making are described. According to some embodiments, a computer-implemented method may comprise estimating a fairness metric of a plurality of decisions indicated in a data set. The decisions may pertain to a plurality of candidates, with each of the candidates belonging to one or more classes of a plurality of classes. The plurality of classes may include at least some to-be-protected classes (sometimes referred to as minority classes). Estimating the fairness metric may comprise a number of steps, including obtaining, using a Hamiltonian Monte Carlo sampling algorithm, a plurality of sample sets from a plurality of density functions associated with a null model and an alternate model constructed with respect to the data set. According to the null model, decisions of the data set meet a targeted fairness criterion with respect to one or more to-be-protected classes, while according to the alternate model, at least some decisions of the data set do not meet the fairness criterion. A respective kernel density estimator may be fitted on at least some sample sets of the plurality of sample sets. Importance sampling may be performed with respect to additional samples obtained from the respective kernel density estimators, and results of the importance sampling may be used to compute the estimate of the fairness metric. The estimated fairness metric may be transmitted to one or more destinations via one or more programmatic interfaces.

According to one embodiment, a system may comprise one or more computing devices. The one or more computing devices may include instructions that upon execution on or across the one or more computing devices cause the one or more computing devices to estimate a fairness metric of a plurality of decisions indicated in a data set. The decisions may pertain to a plurality of candidates, each of whom may belong to one or more classes of a plurality of classes. Some of the classes may be to-be-protected classes. Estimation of the fairness metric may comprise obtaining, using a Hamiltonian Monte Carlo sampling algorithm, a plurality of sets of samples from a plurality of density functions corresponding to at least some random variables of a null model and an alternate model generated with respect to the data set. According to the null model, at least some decisions of the data set meet a fairness criterion with respect to one or more of the to-be-protected classes. A respective kernel density estimator may be fitted to at least some sets of samples of the plurality of sets of samples, and importance sampling may be employed on additional samples obtained from the kernel density estimators as part of the estimation of the fairness metric. The estimated fairness metric may be provided via one or more programmatic interfaces.

According to another embodiment, one or more non-transitory computer-accessible storage media may store program instructions that when executed on or across one or more processors cause the one or more processors to estimate a fairness metric of a plurality of decisions indicated in a data set. The decisions may pertain to a plurality of candidates, with various candidates belonging to one or more classes of a plurality of classes. The plurality of classes may include some to-be-protected classes. The estimation of the fairness metric may comprise obtaining, using a Hamiltonian Monte Carlo sampling algorithm, a plurality of sets of samples from a plurality of density functions corresponding to at least some random variables of a null model and an alternate model generated with respect to the data set. According to the null model, at least some decisions of the data set may meet a fairness criterion with respect to one or more of the to-be-protected classes. The estimation may also comprise fitting a respective kernel density estimator on at least some sets of the plurality of sets of samples; and performing importance sampling on additional samples obtained from the respective kernel density estimators. The estimated fairness metric may be provided via one or more programmatic interfaces.

BRIEF DESCRIPTION OF THE DRAWINGS

FIG. 1 illustrates an example system environment in which decision bias analysis may be performed using algorithms in which Gaussian kernel density estimators and importance sampling are used to estimate Bayes factors, according to at least some embodiments.

FIG. 2 is a flow diagram illustrating aspects of operations which may be performed to analyze decisions for possible biases, according to at least some embodiments.

FIG. 6 illustrates examples of the decision making domains for which bias analysis may be performed, according to at least some embodiments.

Figure 3:
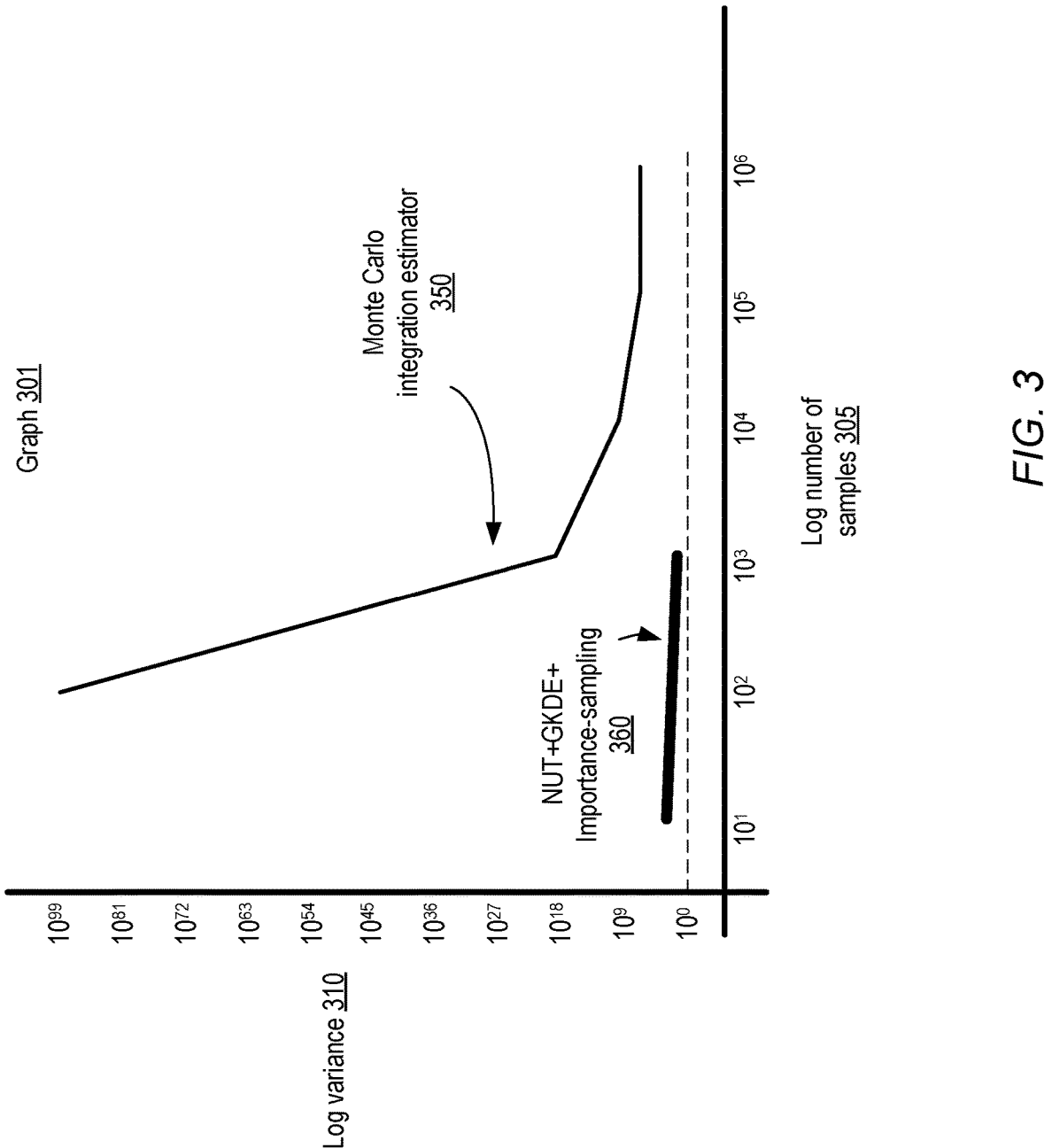
FIG. 3 illustrates example improvements in Bayes factor estimation variances which may be achieved using bias analysis techniques which employ No-U-Turn sampling, Gaussian kernel density estimation, and importance sampling, according to at least some embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION OF EMBODIMENTS

FIG. 1 illustrates an example system environment in which decision bias analysis may be performed using algorithms in which Gaussian kernel density estimators and importance sampling are used to estimate Bayes factors, according to at least some embodiments. Such an algorithm represents a novel and efficient methodology for Bayesian hypothesis testing, which may be implemented using the resources and artifacts of an analytics service 110 of system 100. Bias analysis may also be referred to herein as fairness analysis, since estimating that a set of decisions provides non-trivial evidence of bias is equivalent to estimating that the set of decisions provides non-trivial evidence of unfairness.

Bayesian hypothesis testing may be summarized as follows. To estimate whether a given set of decisions such as a sequence of results of coin tosses (Head, Tail, Head, Head, Tail, Tail, Head) is biased or not, a pair of models representing respective differing assumptions about statistical distributions of events associated with the decisions may first be generated. Then, the extent to which support for each of the models is available in the available decision data (e.g., the sequence of coin toss results) is estimated. The first model of the pair, which represents the case in which the decision making procedure is unbiased or meets a set of targeted fairness criteria, is referred to as a "null" model, and the corresponding hypothesis is referred to as a null hypothesis. The second model, which represents the case in which the decision procedure is unfair, and where the extent of the bias in the decision procedure is assumed to be unknown a priori, is referred to as the "alternate" (or "alternative") model, and the corresponding hypothesis is referred to as the alternate hypothesis (or the alternative hypothesis). The details of the targeted fairness criteria may vary, and may be defined by the entity or individuals on whose behalf the fairness/bias analysis is being performed in various embodiments. The ratio of the evidence for the alternate model to the evidence for the null model (based on the decision data available) is referred to as the Bayes factor. The Bayes factor, a fairness metric which can be interpreted as an indicator of confidence regarding the presence of bias or unfairness for various types of decision data sets (such as interviewing decisions, hiring decisions, loan-granting decisions, and the like) may be estimated using Gaussian kernel density estimators in combination with importance sampling in various embodiments. If the Bayes factor is estimated to be close to zero, this indicates that there is no reason to reject the possibility of bias; however, if the Bayes factor has a value much higher than one, this suggests that there is a greater probability that bias may have affected the decisions. Note that a high Bayes factor does not prove the existence of bias; nevertheless, it can be used as a signal of potential bias.

Bayesian hypothesis testing can be used to test for a variety of fairness properties. For example, if a set of candidates for a job include some number of males and some number of females, this approach can be used to estimate and compare the selection rates of the two classes of candidates (male and female). This type of analysis, in which the decisions made with respect to different demographic sub-groups or populations are analyzed for fairness, may be referred to as analysis for demographic parity. In some legal jurisdictions, specific values of the Bayes factors are sometimes used to make decisions as to whether to proceed with discrimination-related lawsuits. For example, in the United States, a disparate impact lawsuit may at least in some cases be initiated after verifying that the Bayes factor is no smaller than 0.8; this is referred to as the "four-fifths" test.

In many real-world scenarios, more complex properties of the decision data may have to be tested for bias than is feasible using a simple test similar to the four-fifths test. For example, in a scenario in which hiring decisions with respect to some set of candidates are being analyzed, in some cases competence or qualification levels (e.g., assigned to the candidates by external experts uninvolved in the hiring decisions) may be available for the different candidates, and such information may be taken into account when testing for equality of odds of being hired for candidates of different qualification levels.

In some embodiments, numerous attributes of the candidates with respect to whom the decisions were made may have to considered in combination for fairness/bias analysis, such as gender, political affiliation, ethnicity/race, caste, age, and so on, depending on the legal system in use, the norms or internal rules/practices of the organization making the decisions, and so on. Each of the candidates may belong a particular class corresponding to each attribute (e.g., for the age attribute, the group of classes may include "below 25 years", "2550 years" and "above 50 years" for one use case), and some of the classes corresponding to a given may be protected against discrimination (for example, laws against age discrimination may be in effect). In such multi-attribute scenarios, the possibility of "gerrymandering" may have to be examined as well. In the context of fairness analysis, gerrymandering may be said to occur when the results of a decision set appear to be fair when some subset of attributes of the candidates are considered, but are not actually found to be fair if all pairs of attributes are taken into account. Consider a simple scenario in which only two attributes are considered: gender (whose possible classes are male and female) and age (whose possible classes are "under 50 years" and "over 50 years"), and an equal number of candidates are members of each of the four combinations of classes ((male, over-50), (female, over-50), (male, under-50) and (female, under-50)). One gerrymandered result in this example would correspond to the scenario in which all the male candidates over 50 years old were selected for jobs, and all the female candidates under 50 years old were also selected. In this example, the candidates who were male and under 50 years old, or female and over 50 years old, may feel that the hiring procedure was unfair even though the overall result may not have appeared to discriminate on the basis of age alone or gender alone. To detect and/or avoid such gerrymandering, in some embodiments, the sets of decisions made with respect to each pair of classes (or more generally, n-way combinations of classes where n>1) may be analyzed independently.

The proposed technique which estimates Bayes factors using Gaussian kernel estimators and importance sampling may be applied for any of these kinds of analyses in various embodiments, including testing for demographic parity, gerrymandering as well as equality of odds, regardless of the number of classes/factors to be considered. Note that while demographic parity, equality of odds, and gerrymandering represent respective examples of categories of fairness for which the technique may be applied, the technique may also be used for other fairness categories in at least some embodiments. In some embodiments, users of the technique may define their own custom categories of fairness, and provide guidance or code to indicate how the null and alternate models are to be constructed for the custom categories. The proposed technique may be especially useful in scenarios in which the size of the decision data set being analyzed is such, or the number of different potential factors/classes to be taken into account is so large, that the number of examples representing any particular combination of classes is relatively small. In such scenarios, where the number of actual examples of decisions affecting candidates with a particular combination of classes is not very large, the estimates for Bayes factors obtainable by many conventional techniques may have extremely high variances, making such conventional estimates impractical for use. In contrast, as indicated below and discussed further in the context of FIG. 3, the estimates produced by the proposed technique may have low variances even for relatively small data sets.

According to some embodiments, a computer-implemented method may comprise estimating a fairness metric (such as one or more Bayes factors) of a plurality of decisions indicated in a data set. The plurality of decisions may pertain to a plurality of candidates. Each of the candidates may belong to one or more classes of a plurality of classes, of which at least some classes have been designated (e.g., by relevant anti-discrimination laws or internal policies of the organizations at which the decisions are made) as to-be-protected classes. To-be-protected classes may also be referred to as minority classes, or simply as protected classes in some embodiments. The estimation of the fairness metric may comprise several steps in various embodiments. One of the steps may include, for example, utilizing a Hamiltonian Monte Carlo sampling algorithm (such as a No-U-Turn sampling algorithm) to obtain a plurality of sets of samples from a plurality of density functions corresponding to at least some random variables of a null model and an alternate model generated with respect to the data set indicating the decisions. According to the null model, at least some decisions of the data set meet a fairness criterion with respect to one or more of the to-be-protected classes; according to the alternate model, at least some of the decisions may have been unfair. The fairness criteria which distinguish the null model from the alternate hypothesis may be specified by the entity or individuals on whose behalf the fairness/bias analysis is being performed in various embodiments, and may vary based on the fairness category of interest e.g., target criteria for demographic parity logically equivalent to the following may be defined: "the difference between the percentage of successful candidates of a particular demographic group, and the percentage of total candidate who belong to that group, should not exceed X %". Similar fairness criteria may be defined for equality of odds, gerrymandering, and other fairness categories in various embodiments. The estimation of the fairness metric may include fitting a respective Gaussian kernel density estimator on at least some sets of the plurality of sets of samples obtained using the Hamiltonian Monte Carlo sampling algorithm, followed by performing importance sampling on additional samples obtained via the Gaussian kernel density estimators. The estimated fairness metric may be provided via one or more programmatic interfaces, e.g., to downstream programs which can initiate actions (such as causing a machine learning model which was used for the decisions of the data set to be re-evaluated/re-trained) in scenarios in which non-trivial evidence of unfairness is found.

Hamiltonian Monte Carlo (HMC) sampling algorithms are a class of Markov chain Monte Carlo (MCMC) algorithms which avoid the random walk behavior and sensitivity to correlated parameters that plague many MCMC methods by taking a series of steps informed by first-order gradient information. These features allow HMC algorithms to converge to high-dimensional target distributions much more quickly than simpler methods such as random walk Metropolis or Gibbs sampling. However, HMC's performance is highly sensitive to two user-specified parameters: a step size S and a desired number of steps L. In particular, if L is too small then the algorithm may exhibit undesirable random walk behavior, while if L is too large the algorithm wastes computation. The No-U-Turn sampling (NUTS) algorithm is a variant or extension of HMC which eliminates the need to set a number of steps L. NUTS uses a recursive algorithm to build a set of likely candidate points that spans a wide swath of the target distribution, stopping automatically when it starts to double back and retrace its steps. Empirically, NUTS has been shown to perform at least as efficiently as and sometimes more efficiently than a well-tuned standard HMC method, without requiring user intervention or costly tuning runs.

Generally speaking, density estimators are algorithms which take a D-dimensional dataset and produce an estimate of the D-dimensional probability distribution from which that data is drawn. In one approach towards density estimation, Gaussian mixture models may be used, which represent the density as a weighted sum of Gaussian distributions. Gaussian kernel density estimation (KDE) is in some sense an algorithm which takes the mixture-of-Gaussians idea to its logical extreme: it uses a mixture consisting of one Gaussian component per point, resulting in an essentially non-parametric estimation of density.

At a high level, the intuition behind importance sampling is that certain values of the input random variables in a simulation or model may have more impact on a parameter being estimated than others. If these "important" values are emphasized by sampling more frequently, then the estimator variance can be reduced, which is of course a desirable property. The problem being addressed using importance sampling can also be framed in the following way: we wish to estimate the estimated value of some function or random variable, but sampling from the actual distribution of that original function is difficult. So, instead, samples are obtained from a result of some transformation applied to the original function. However, because the result of the transformation is inherently different from the original distribution, we adapt or adjust the samples to try to better approximate the original distribution, and this adaptation/adjustment is referred to as importance sampling.

The novel fairness analysis techniques described herein may be better understood with the help of a concrete simplified example. For simplicity and concreteness assume a scenario in which only two class groups are considered: gender and race. The gender class group comprises two classes, male and female, where the minority or to-be-protected class is female. In the race group, assume just two classes: White and Asian, where the minority or to-be-protected class is Asian. A data set on past hiring decisions from which some relevant statistics can be extracted is assumed to be available. Let $T_a$, $T_w$, $T_f$ and $T_m$ be the number of Asian, White, Female, and Male candidates, respectively, in the data set. Let $S_a$, $S_w$, $S_f$ and $S_m$ be the number of Asian, White, Female, and Male candidates who were selected in the set of hiring decisions indicated in the data set, respectively.

To estimate a fairness/bias metric using a Bayesian hypothesis approach, as mentioned above, a null model (corresponding to the fair/unbiased case) and an alternate model (corresponding to the unfair/biased case) may be constructed in various embodiments, e.g., comprising respective sets of random variables. In the following formulas for the models, Beta( ) refers to the beta distribution, U( ) refers to the uniform distribution, and Bin( ) refers to a binomial distribution. An example null model may be represented by eight random variables indicated in (1)-(8) below.

$$\mu_m \sim \text{Beta}(1, 1) \tag{1}$$

$$\mu_f \sim U\left(\frac{4}{5}\mu_m, 1\right) \tag{2}$$

$$K_m \sim \text{Bin}(T_m, \mu_m) \tag{3}$$

$$K_f \sim \text{Bin}(T_f, \mu_f) \tag{4}$$

$$\mu_w \sim \text{Beta}(1, 1) \tag{5}$$

$$\mu_n \sim U\left(\frac{4}{5}\mu_w, 1\right) \tag{6}$$

$$K_w \sim \text{Bin}(T_w, \mu_w) \tag{7}$$

$$K_a \sim \text{Bin}(T_a, \mu_a) \tag{8}$$

The random variables in (1)-(8) model the selection rates for the different classes, with the subscripts a, w, f and m used to indicate Asian, White, Female and Male classes. The K random variables in (1)-(8) model the number of candidates selected for each of the four classes.

An example alternate model corresponding to the above null model may comprise eight random variables indicated in (9)-(16) below. The η random variables in (9)-(16) model the selection rates for the different classes under the alternate hypothesis. The L random variables in (9)-(16) model the number of candidates selected for each of the four classes under the alternate hypothesis. Different assumptions made in the null model as opposed to the alternate model regarding selection rates for to-be-protected or minority classes are indicated by the differences between the distributions for (a) $\mu_f$ (shown in (2) above) versus $\eta_f$ (shown in (10)) and (b) $\mu_a$ (shown in (6) above) versus $\eta_p$ (shown in (14)). The different parameters of the distributions of corresponding random variables of the null and alternate models may be based at least in part on the categories of fairness for which the decisions are being analyzed in various embodiments.

$$\eta_m \sim \text{Beta}(1, 1) \tag{9}$$

$$\eta_f \sim U\left(0, \frac{4}{5}\eta_m\right) \tag{10}$$

-continued $$L_m \sim \text{Bin}(T_m, \eta_m) \tag{11}$$

$$L_f \sim \text{Bin}(T_f, \eta_f) \tag{12}$$

$$\eta_w \sim \text{Beta}(1, 1) \tag{13}$$

$$\eta_a \sim U\left(0, \frac{4}{5}\eta_w\right) \tag{14}$$

$$L_w \sim \text{Bin}(T_w, \eta_w) \tag{15}$$

$$L_a \sim \text{Bin}(T_a, \eta_a) \tag{16}$$

The objective of the analysis is to compute the Bayes factor, the ratio of the evidence in the data set for the alternate model to the evidence for the null model, e.g., by computing the following ratio of probabilities (the notation Pr[a,b,c,d] here denotes the probability of the combination of a, b, c and d):

$$\frac{Pr[L_m = S_m, L_f = S_f, L_w = S_w, L_a = S_a]}{Pr[K_m = S_m, K_f = S_f, K_w = S_w, K_a = S_a]} \tag{17}$$

Unfortunately, there is no closed-form solution for the ratio indicated in (17). Accordingly, in order to obtain an estimated solution, a multi-step estimation algorithm similar to the following may be employed in at least some embodiments. In a first step (Step 1), the following probability densities (posterior distributions) corresponding to pairs of values for the random variables introduced above, may be considered.

$$f_1(a,b) = Pr[\mu_m = a, \mu_f = b | K_m = S_m, K_f = S_f, K_w = S_w, K_a = S_a] \tag{18}$$

$$f_2(a,b) = Pr[\mu_w = a, \mu_a = b | K_m = S_m, K_f = S_f, K_w = S_w, K_a = S_a] \tag{19}$$

$$g_1(a,b) = Pr[\eta_m = a, \eta_f = b | L_m = S_m, L_f = S_f, L_w = S_w, L_a = S_a] \tag{20}$$

$$g_2(a,b) = Pr[\eta_w = a, \eta_a = b | L_m = S_m, L_f = S_f, L_w = S_w, L_a = S_a] \tag{21}$$

The posterior distributions of (18)-(21) are proportional to the values needed to estimate the Bayes factor using the original distributions shown in (17); in the limit, the behavior of these distributions matches those of the original distributions. The densities shown in (18)-(21) also have no closed-form solution, and are continuous. N samples may be obtained from each of the densities indicated in (18)-(21), e.g., using a No-U-Turn sampler in some embodiments. In other embodiments, other Hamiltonian Monte Carlo algorithms may be used. At a high level, the sampling methodology used simulates the trajectory of a particle on the density.

$$\mu_m^1, \mu_f^1, \mu_m^2, \mu_f^2, \ldots, \mu_m^N, \mu_f^N, \sim f_1 \tag{22}$$

$$\mu_w^1, \mu_a^1, \mu_w^2, \mu_a^2, \ldots, \mu_w^N, \mu_a^N, \sim f_2 \tag{23}$$

$$\eta_m^1, \eta_f^1, \eta_m^2, \eta_f^2, \ldots, \eta_m^N, \eta_f^N, \sim g_1 \tag{24}$$

$$\eta_w^1, \eta_a^1, \eta_w^2, \eta_a^2, \ldots, \eta_w^N, \eta_a^N, \sim g_2 \tag{25}$$

In Step 2 of the estimation algorithm, corresponding densities indicated in (27)-(30) below are computed from the samples of (22)-(25) by fitting respective Gaussian kernel density estimators (KDEs) on each of the sets of samples. In traditional approaches, a decision may have to be made to choose a particular family of distributions (e.g., normal distributions with known means, normal distributions with known means and variances, mixtures of normal with uniform distributions, etc.) and then effort may be expended to try and find the particular distributions of that chosen family which correspond to the posterior samples. The KDEs approximate the distributions of the random variables non-parametrically given the posterior Ampes available, without making any assumptions about the family of distribution.

$$f_1' = KDE(\mu_m^1, \mu_f^1, \mu_m^2, \mu_f^2, \dots, \mu_m^N, \mu_f^N) \tag{26}$$

$$f_2' = KDE(\mu_w^1, \mu_a^1, \mu_w^2, \mu_a^2, \dots, \mu_w^N, \mu_a^N) \tag{27}$$

$$g_1' = KDE(\eta_m^1, \eta_f^1, \eta_m^2, \eta_f^2, \dots, \eta_m^N, \eta_f^N) \tag{28}$$

$$g_2' = KDE(\eta_w^1, \eta_a^1, \eta_w^2, \eta_a^2, \dots, \eta_w^N, \eta_a^N) \tag{29}$$

In Step 3 of the estimation algorithm, M samples are obtained from each of the densities shown in (26)-(29). The number M may be much large than N, which was the number of samples obtained in Step 1. These M-sized samples are indicated in (30)-(3) below.

$$\mu_m^{1'}, \mu_f^{1'}, \mu_m^{2'}, \mu_f^{2'}, \dots, \mu_m^{N'}, \mu_f^{N'}, \sim f_1' \tag{30}$$

$$\mu_w^{1'}, \mu_a^{1'}, \mu_w^{2'}, \mu_a^{2'}, \dots, \mu_w^{N'}, \mu_a^{N'}, \sim f_2' \tag{31}$$

$$\eta_m^{1'}, \eta_f^{1'}, \eta_m^{2'}, \eta_f^{2'}, \dots, \eta_m^{N'}, \eta_f^{N'}, \sim g_1' \tag{32}$$

$$\eta_w^{1'}, \eta_a^{1'}, \eta_w^{2'}, \eta_a^{2'}, \dots, \eta_w^{N'}, \eta_a^{N'}, \sim g_2' \tag{33}$$

In Step 4, importance sampling may be implemented with respect to the samples obtained from the KDE results. The following computations may be performed for every sample $\mu_m^{1'}, \mu_f^{1'}, \mu_w^{1'}, \mu_a^{1'}$:

$$p_n^1 = Pr[K_m = S_m, K_f = S_f, K_w = S_w, \\ K_a = S_a \mid \mu_m = \mu_m^{i\,'}, \mu_f = \mu_f^{i\,'}, \mu_w = \mu_w^{i\,'}, \mu_a = \mu_a^{i\,'}] \tag{34}$$

$$w_n^j = \frac{p_n^1 \times f_1'(\mu_m^{i\,'}, \mu_f^{i\,'}) \times f_2'(\mu_w^{i\,'}, \mu_a^{i\,'})}{Pr[\mu_m = \mu_m^{i\,'}, \mu_f = \mu_f^{i\,'}, \mu_w = \mu_w^{i\,'}, \mu_a = \mu_a^{i\,'}]} \tag{35}$$

$$p_a^1 = Pr[L_m = S_m, L_f = S_f, L_w = S_w, \\ L_a = S_a \mid \mu_m = \eta_m^{i\,'}, \eta_f = \eta_f^{i\,'}, \eta_w = \eta_w^{i\,'}, \eta_a = \eta_a^{i\,'}] \tag{36}$$

$$w_a^j = \frac{p_a^1 \times f_1'(\eta_m^{i\,'}, \eta_f^{i\,'}) \times f_2'(\eta_w^{i\,'}, \eta_a^{i\,'})}{Pr[\eta_m = \eta_m^{i\,'}, \eta_f = \eta_f^{i\,'}, \eta_w = \eta_w^{i\,'}, \eta_a = \eta_a^{i\,'}]} \tag{37}$$

The weights (w) in (35) and (37) represent the adjustments made as part of importance sampling to adapt to the fact that we are not sampling from the original distribution of interest, but from a transformation of the original distributions obtained using the KDEs. Ideally, the proposal distribution on which importance sampling is performed is very similar to the original distribution; if this is the case, more of the weights are close to 1. In Step 5 of the procedure the final estimate c for the Bayes factor may be computed as follows.

$$\epsilon = \frac{\sum_{i=1}^{M} w_a^i}{\sum_{i=1}^{M} w_n^i} \tag{38}$$

The technique described in the simple example above may easily be extended or generalized to cover a wider array of to-be-protected or minority demographic classes, to cover equality of odds (in which qualification levels of candidates are taken into account when analyzing bias), to cover gerrymandering (scenarios in which decision results which appear to be fair based on some criteria actually represent manipulations of fairness policies), and so on.

In at least some embodiments, code similar to the following may be used to automatically generate the random variables of the null and alternate models. Note that although the code presented below is in Python-like syntax, any desired programming language may be employed in other embodiments. The provided example code covers generating models covering demographic parity, equality of odds, as well as gerrymandering. The variable "path" is used, in effect, to tag the random variables as various additional classes are considered, while "const" contains the constants of the model. Note that parameters of the distributions of the random variables (e.g., the parameters of the Uniform or Binomial distributions in the example code) may vary for different fairness criteria and different fairness categories such as demographic parity, equality of odds, gerrymandering etc. In some embodiments in which the bias analysis techniques are implemented at a cloud-based service, clients of the cloud-based service may supply code similar to the following (e.g., with customized parameters based on the fairness criteria selected by the client for one or more fairness categories) via programmatic interfaces to the service, and the provided code may be executed at the service to generate the random variables on behalf of the client for analysis of a specified decision data set. In at least one embodiment, the client may specify the categories of fairness (e.g., demographic parity, equality of odds, etc.) for which the decision data set is to be analyzed, and the service may use its own library of code to generate the appropriate random variable distributions for the null and alternate hypotheses. In at least one embodiment, even the decision regarding which specific categories of fairness are to be tested may be left to the service; in effect, a client may simply provide a decision data set and request the service to perform fairness analysis (e.g., using as many different fairness criteria as the service supports).

```
-----Start example code for models used for Bayes factor estimation----------
def majority(path, alpha,beta,N):
    theta = sample('theta' + path, Beta(alpha,beta))
    X = sample('X' + path, Binomial(N,theta))
    return [theta,X]
def demographic__parity(path,alpha,beta,N,M):
    [theta,X] = majority(i,alpha,beta,N)
    phi = sample('phi' + path, Uniform(0.8 * theta,1.0))
    Y = sample('Y' + path, Binomial(M,phi))
```

-continued

```
def demographic_parity_dual(i,alpha,beta,N,M):
    [theta,X] = majority(alpha,beta,N)
    phi = sample('phi' + str(i), Uniform(0.0,theta * 0.8))
    Y = sample('Y' + str(i), Binomial(M,phi))
def equality_odds_template(f):
    for j in ['qualified','unqualified']:
    f(j,const)( )
def gerrymandering(f):
    for j in ['female_','male_']:
        for k in ['below40_','above40_']:
            f(path + j + k)( )
-------------End example code--------------------------------------------------------------
```

As one skilled in the art will appreciate in light of this disclosure, certain embodiments in which the bias/fairness estimation techniques introduced above are implemented may be capable of achieving various advantages and practical benefits, including obtaining high-confidence results of bias analysis more quickly (and with lower variance in the estimates) than may be possible using conventional techniques. Furthermore, the amount of storage and other resources required to store decision data to be used for fairness analysis may be reduced relative to conventional approaches. The proposed estimation techniques may also be used to quickly initiate rectification of biases detected in machine learning models used for making the decisions, and for tracking the fairness of the machine learning models (or other decision making methodologies or tools) over time. Example results indicating some of the variance-related benefits achieved from the proposed technique are discussed below in conjunction with the description of FIG. 3.

In the embodiment depicted in FIG. 1, analytics service 110 of system 100 may implement one or more programmatic interfaces 177, such as a set of application programming interfaces (APIs), command-line tools, web-based consoles, graphical user interfaces and the like. Clients of the analytics service 110 may submit various types of requests from a variety of client devices 180, such as desktops, laptops, smart phones, tablets and the like. The submitted requests may be analyzed/parsed at a set of request handlers 178, which may then pass on internal versions of the requests to other components of the analytics service for fulfillment. Results obtained from the other components, such as Bayes factor estimates obtained by decision bias analyzers 135, may be provided to the clients by the request handlers in the depicted embodiment.

A client may, for example, indicate that a data set comprising records of a set of decisions is to be obtained from a decision data source 122 and analyzed for potential bias or unfairness. Clients may submit the decisions data set themselves via programmatic interfaces 177 in some cases, instead of indicating the data sources 122 from which the decision data is to be obtained. Furthermore, in at least some embodiments, the clients may use the programmatic interfaces 177 to provide various types of metadata to be used for the fairness analysis at the analytics service 110. Such metadata, which may be stored at repository 126, may include bias definitions (e.g., similar to the four-fifths rule discussed earlier), targeted fairness criteria or objectives (e.g., high-level objectives similar to "information about a candidate's birth country or religious affiliation cannot be used to discriminate", or more precise mathematical definition of the objectives), specific fairness categories such as demographic parity, equality of odds, etc. for which data sets are to be tested, the definitions of various groups of classes including to-be-protected classes, and the like in different embodiments. In at least some embodiments, a client may indicate, via the programmatic interfaces, the set of anti-discrimination laws or organizational rules/procedures to be enforced to the analytics service 110 for various types of decision data to be analyzed on behalf of the client, e.g., by providing the relevant legal documents/regulations or a source from which the legal documents can be obtained by the service 110. Such metadata may be used, for example, at the analytics service for selecting or generating the statistical distributions of the null and alternate models to be used for various decision data sets in at least one embodiment. In at least one embodiment, the analytics service 110 may comprise a knowledge base 130 in which records of earlier bias analyses with respect to a variety of decision-making domains may be stored. Such a knowledge base may be used, for example, to select some of the parameters and/or statistical distributions to be used in the null and alternate models, as well as parameters or hyper-parameters of the bias estimation procedure.

Algorithm repository 125 may comprise a suite of algorithms which can be employed for fairness/bias analysis of decision data in the depicted embodiments. Such algorithms may include at least one enhanced fairness analysis algorithm employing Gaussian kernel density estimators and importance sampling for estimating Bayes factors. Such an algorithm may be referred to as a KDE-IS (Kernel Density Estimators Importance Sampling) algorithm herein. Other estimation algorithms for fairness metrics may also be supported by the analytics service 110 in some embodiments, such as Monte Carlo integration using floating points, Meng-Wong estimation, harmonic mean estimation, and so on. Libraries/modules implementing lower-level algorithms (such as KDEs, importance sampling algorithms) and the like, which are invoked as part of the overall fairness analysis algorithms, may also be stored at and/or accessed from the algorithm repository 125 in various embodiments. In some embodiments, a client of the analytics service 110 may specify the particular fairness/bias estimation algorithm (or combination of algorithms) to be used to analyze a particular set of decisions. In other embodiments, one or more decision bias analyzers 135 may automatically select the appropriate algorithms to be used, e.g., based on the size and complexity of the decision data set to be analyzed. Individual ones of the decision bias analyzers 135 may comprise software and/or hardware components of one or more computing devices in the depicted embodiment.

A decision bias analyzer 135 may determine (e.g., based on programmatic input received from a client) a set of candidate class groups pertaining to a selection procedure which is to be analyzed using at least the KDE-IS algorithm in various embodiments. Individual ones of the candidate class groups may comprise a respective baseline class (sometimes referred to as a majority class) and at least one respective to-be-protected class (sometimes referred to as a minority class). Examples of class groups may include ethnicity, gender, etc. in different embodiments, depending on the particular problem domain in which the selection decisions were made. The decision bias analyzer may also obtain (e.g., from decision data sources 122) a data set indicating a plurality of selection decisions with respect to a set of candidates, where each of the candidates belongs to at least one class of at least one class group of the set of candidate class groups.

The decision bias analyzer 135 may generate or define (a) a first plurality of random variables of a null model for Bayesian hypothesis testing with respect to the data set and (b) a second plurality of random variables of an alternate model for Bayesian hypothesis testing with respect to the data set. Logic similar to that indicated in the example code shown earlier may be used for generating the random variables in some implementations. According to the null model, at least some selection decisions of the data set may meet a targeted fairness criterion with respect to to-be-protected classes. According to the alternate model, at least some selection decisions of the data set may not meet the fairness criterion, or have a higher probability of being unfair than under the null model.

The decision bias analyzer 135 may estimate a Bayes factor as a fairness metric for the data set in various embodiments. The estimating procedure may comprise obtaining, using a Hamiltonian Monte Carlo sampling algorithm, a plurality of sets of samples from a plurality of density functions corresponding to at least some random variables of the null model and the alternate model. The estimating procedure may further comprise fitting a respective Gaussian kernel density estimator (KDE) on at least some sets of the plurality of sets of samples, and then performing importance sampling on additional samples obtained from the KDEs. The estimated fairness metrics may then be stored (e.g., at a repository of the analytics service) and/or transmitted to one or more destinations in various embodiments. Such destinations may include, for example, the client computing devices 180 and/or one or more bias detection-based automated action generators 150 in the depicted embodiment. If the fairness metrics indicate bias (or a higher-than-a-threshold probability of bias), one or more actions 152 may be initiated by the action generators in some embodiments. For example, if a software tool or machine learning model was used for making the decisions of the decision set, that tool or model may be automatically re-evaluated and/or retrained in an effort to reduce or eliminate its biases. In some embodiments, the automated actions generated may include sending notifications to one or more fairness enforcement officials within an organization, and/or storing records of the bias estimates within specified repositories.

In some embodiments, several decision data sets whose fairness is to be compared relative to one another (e.g., decisions made over different time spans by the same set of decision makers, or decisions made by different departments within an organization) may be obtained at the decision bias analyzer 135. Respective fairness/bias estimates may be generated for individual decision data sets in such scenarios, and a comparison of the fairness of the decisions of the different data sets may be generated and stored or provided to destinations such as action generators 150 via programmatic interfaces. In at least one embodiment, a given decision data set may be analyzed with respect to several different fairness criteria for different categories of fairness (such as the demographic parity, equality of odds, gerrymandering etc.) specified by a client, taken separately or in combination, and respective bias estimates corresponding to each criterion and/or combination of criteria may be generated and provided by the analytics service via programmatic interfaces 177 if desired.

FIG. 2 is a flow diagram illustrating aspects of operations which may be performed to analyze decisions for possible biases, according to at least some embodiments. As shown in element 201, a set of class groups (e.g., groups based on race, age, gender, etc.) associated with candidates with respect to which decisions are to be analyzed may be determined, e.g., via programmatic interfaces of an analytics service (similar to analytics service 110 of FIG. 1) or analytics tool. An indication of at least some minority or to-be-protected classes within one or more of the groups may also be obtained in various embodiments.

Target fairness objectives/criteria for the to-be-protected classes may be determined in at least some embodiments (element 204). In at least one embodiment, the target fairness criteria may not have to be specified to the analytics service or tool; instead, the tool may assume a default set of fairness objectives, in which for example, all classes of all groups are to be treated equally. In some embodiments, a client of an analytics service may specify, via programmatic interfaces 177, that a Bayes factor is to be estimated as the fairness metric.

A data set DS indicating a plurality of decisions (e.g., selections for interviewing or hiring) made with respect to a set of candidates over some time period may be obtained (element 207). The various candidates may belong to one or more classes of the class groups. In at least some embodiments, the decisions may have been made at least in part using one or more machine learning models. DS may indicate not only the identities of the selected candidates, but also their class memberships in various embodiments.

Models to be used for Bayes factor estimation (i.e., for fairness analysis of DS using Bayesian hypothesis testing) may be generated in various embodiments (element 210). A null model and an alternate model comprising respective sets of random variables may be generated. The null model may represent a scenario in which the target fairness objectives/criteria are satisfied, while the alternate model may represent a set of hypothetical scenarios in which the target fairness objectives are not satisfied. In some embodiments, a set of heuristics (e.g., indicating the types of statistical distributions which should be selected for various random variables, and/or one or more parameters of such distributions) may be used, in addition to the target fairness objectives when generating the models. In at least one embodiment in which the fairness analysis is performed at an analytics service, a client may provide an indication of at least some parameters or hyper-parameters the models e.g., a client may specify whether the four-fifths rule or a similar rule is to be used, or the client may specify one or more distributions (or distribution parameters) to be incorporated form various random variables. In some embodiments, a client may specify the set of random variable distributions to be included in one or more of the models, or provide a program which can be used to generate the distributions. In at least some embodiments, multiple pairs of null and alternate models may be generated.

The Bayes factor may then be estimated, e.g., by performing operations similar to those shown in elements 213, 216 and 219 in some embodiments. A No-U-Turn sampler or some other Hamiltonian Monte Carlo sampling algorithm may be used to obtain sets Samp1 of samples from density functions corresponding to the random variables included in the null model and the alternate model (element 213) in some embodiments. Other samplers may be used to obtain the sets of samples in some embodiments. Then, a respective Gaussian kernel density estimator may be fitted on the sets of samples (element 216). Other types of kernel density estimators may be employed in different embodiments. In at least some embodiments, Scott smoothing (or some alternative smoothing approach) may be used when fitting the KDEs. A larger set of samples (than the samples obtained earlier in operations corresponding to element 213) may be obtained from the results of the KDEs, and importance sampling may be applied to the larger set of samples to compute a final estimate of the Bayes factor (element 219).

In various embodiments, the estimated Bayes factor may be stored and/or provided as a fairness metrics of the DS decisions to one or more destinations via programmatic interfaces (element 222), e.g., causing actions such as re-evaluation or re-training of machine learning models to be initiated in scenarios in which a higher-than-threshold bias was detected in the decisions made with the help of the models.

It is noted that in various embodiments, at least some operations other than those illustrated in the flow diagram of FIG. 2 may be performed to implement the fairness analysis techniques described above. Some of the operations shown may not be implemented in some embodiments, may be implemented in a different order, or in parallel rather than sequentially. In some embodiments, other types of sampling techniques may be used in operations corresponding to elements 213 and 219, and/or density estimators other than Gaussian KDEs may be employed in operations corresponding to element 216.

FIG. 3 illustrates example improvements in Bayes factor estimation variances which may be achieved using bias analysis techniques which employ No-U-Turn sampling, Gaussian kernel density estimation, and importance sampling, according to at least some embodiments. In graph 301 of FIG. 3 the number of samples which were obtained from a decisions set (e.g., in the importance sampling step as discussed above) is represented using a logarithmic scale along the X-axis, and the variance in the estimate of the Bayes factor is represented, also using a logarithmic scale, on the Y-axis. The change in the variance of the estimate, as a function of the sample size is shown for two estimation algorithms. (Generally speaking, lower variance is preferred in estimates of any metric, because higher variance is indicative of higher uncertainty/lower confidence.) Curve 350 represents the variance of the Bayes factor estimates generated by a Monte Carlo integration-based estimator, while curve 360 shows the variance of the Bayes factor estimates generated using the novel algorithm introduced herein, using a combination of No-U-Turn sampling (NUTS), Gaussian KDEs, and importance sampling.

When the Monte Carlo integration-based estimation technique is used, the variance is extremely high (e.g., in the vicinity of $10^{99}$) when the number of samples is low (e.g., around 100). While the variance the Monte Carlo integration technique does drop, it remains orders of magnitude higher than the variance of the estimate generated using the novel technique. The novel technique is able to generate a low-variance estimate even with very small sample sets (e.g., less than a thousand), while the Monte Carlo integration technique is unable to approach such low variances even when millions of samples are used. Graph 301 thus confirms the suitability of the novel technique proposed herein for scenarios in which relatively small amounts of decision data are available.

Figure 4:
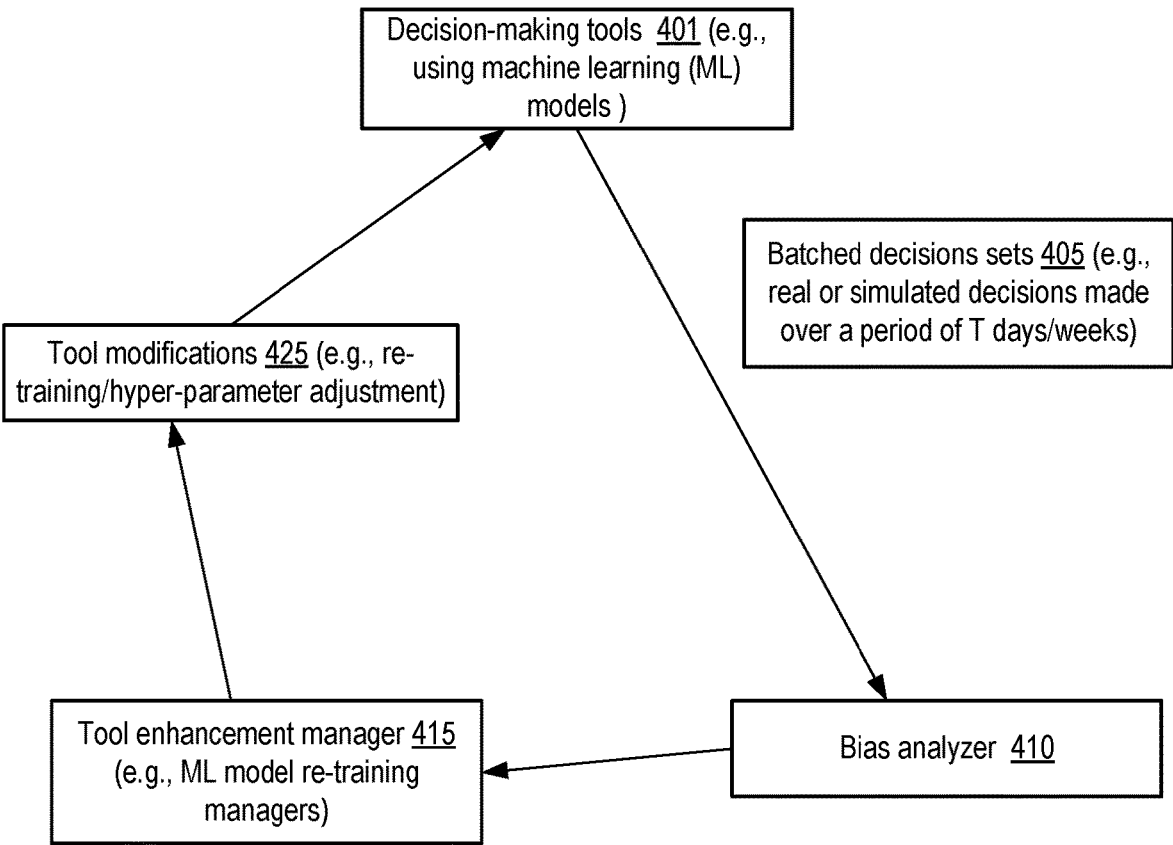
FIG. 4 illustrates an example iterative approach towards detecting and reducing bias in decision-making tools such as machine learning models, according to at least some embodiments.

FIG. 4 illustrates an example iterative approach towards detecting and reducing bias in decision-making tools such as machine learning models, according to at least some embodiments. In the depicted embodiment, one or more decision-making tools 401 (which may in turn comprise one or more machine learning (ML) models such as classifiers) are used to generate selection decisions pertaining to various sets of candidates, e.g., based on analysis of candidate resumes, recommendations and the like. The set 405 of decisions made by the tools 401 over some period of time (e.g., T days or weeks) may be batched together and sent to a bias analyzer 410 (which may be similar in functionality and features to decision bias analyzers 135 of FIG. 1) in the depicted embodiment.

The bias analyzer may use a KDE-IS algorithm similar to the algorithm introduced above to generate an estimate of fairness or bias in a given batched decision set 405. If the estimate indicates or suggests the presence of non-negligible levels of bias in the decisions made by the tools 401, the bias analyzer may send an indication of one or more corrective or remediation actions to be taken to a tool enhancement manager 415 (e.g., a machine learning model re-training manager) implemented at one or more computing devices. The tool enhancement manager 415 may in turn initiate a procedure for modifying/enhancing the decision-making tool (e.g., by re-training machine learning models and/or adjusting one or more hyper-parameters of the models), as indicated in element 425. Newer versions of the tools 401 may thus be obtained, with the goal being to eliminate or at least reduce the extent of the bias in the tools' decisions. The specific types of changes made to the tools may differ, depending for example on the algorithms used in the tools, the ability of the tool enhancement managers 415 to synthesize or obtain appropriate training data to reduce bias, and so on. The cycle of analysis and improvement of the tools 401 may be repeated over time, and the estimates of the fairness/unfairness of the tools may be tracked and reported in at least some embodiments. If the results provided by the KDE-IS algorithm suggest that the fairness of the models is not improving over time, a decision may be made to abandon the use of the tools in some embodiments. As suggested earlier, the fairness categories and criteria with respect to which the decisions are being analyzed may be specified programmatically to the bias analyzer 410 in various embodiments, so the process of enhancing/improving the tools 401 may be highly customizable.

In some embodiments, possible bias in the decisions made by the decision-making tools 401 may be analyzed as part of the development or testing of the tools e.g., using simulated decisions made by the tool with respect to a synthesized set of candidates (or historical data regarding decisions made in the past regarding real candidates), before any real-world decisions are made using the tool. If the tools 401 are found to be biased, they may be improved/enhanced before they are released for production use in such embodiments. Several such pre-release fairness testing cycles may be conducted in some embodiments. Note that the fairness category definitions and acceptable fairness criteria (e.g., the specific combinations of candidate properties are to be considered for gerrymandering analysis, the definitions of acceptable demographic parity, etc.) may be changed if desired from one testing cycle to the next. In effect, in various embodiments, a decision-making tool 401 may offer a menu of supported or default fairness categories with associated default fairness criteria (e.g., for demographic parity, the maximum acceptable difference in percentage between the demographic breakdown of a candidate set among a set of classes, and the positive decisions made with respect to the different classes of the candidates in a given decision data set to be analyzed). Using programmatic interfaces of the decision-making tool, a client may specify whether the client wishes to specify custom fairness categories or use the default set, whether the client wishes to use default fairness criteria or specify custom criteria, and so on.

Figure 5:
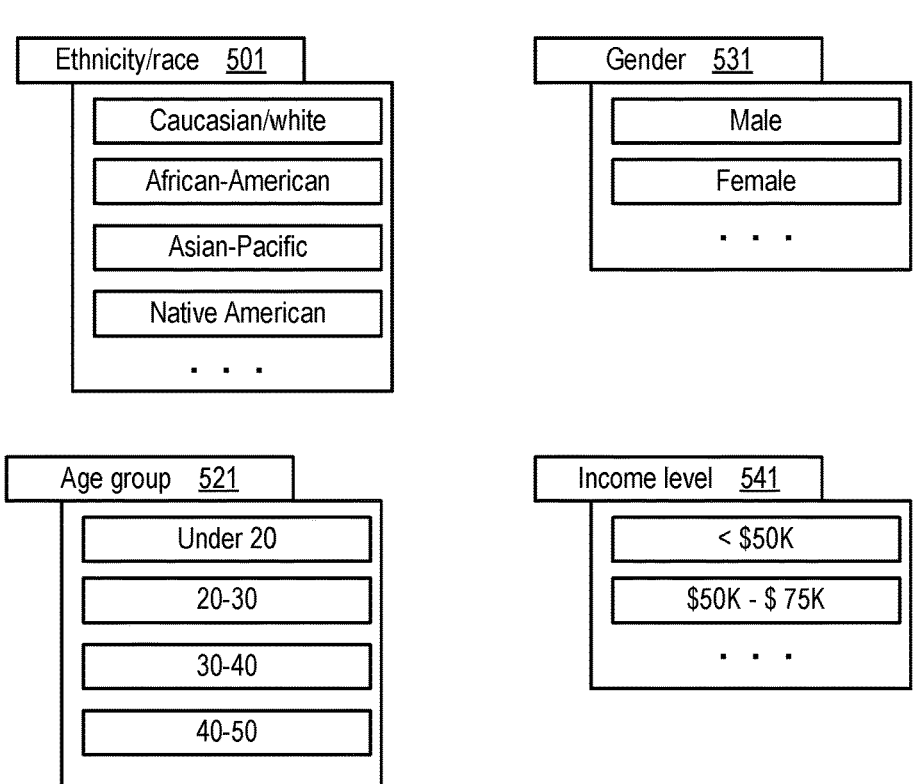
FIG. 5 illustrates example class categories which may be considered when determining whether a set of decisions indicates the presence of bias, according to at least some embodiments.

FIG. 5 illustrates example class groups which may be considered when determining whether a set of decisions indicates the presence of bias, according to at least some embodiments. For example, the class groups indicated in data sets analyzed with the help of the KDE-IS algorithm in some embodiments may include ethnicity/race 501, gender 531, age group 521 and/or income level 541. The specific classes within the class groups may vary from one application to another and/or from one geographical region to another: e.g., with respect to ethnicity/race, different locally-relevant combinations of classes may be defined in different parts of the world. The set of class groups which are taken into account may differ depending on the kinds of decisions being made: for example, income level may be included as a factor when considering decisions such as mortgage approvals, loan approvals and the like, but may not necessarily be relevant to interviewing/hiring decisions.

FIG. 6 illustrates examples of the decision making domains for which bias analysis may be performed, according to at least some embodiments. The KDE-IS algorithm may be used to generate estimates of unfairness on (among other types of decisions) hiring/interviewing decisions 601, promotion decisions 604 within an organization, educational institution acceptance decisions 607 (e.g., decisions to admit/reject applicants to colleges or universities), social institution membership decisions 610 (e.g., decisions to admit/reject applicants to clubs or fraternal organizations), and so on in different embodiments. In some embodiments, the KDE-IS algorithm may be used to analyze the fairness of financial decisions 613 (e.g., decisions regarding approvals for loans, credit cards, credit card interest rates, etc.), housing and other resource allocation decisions 616 (e.g., decisions to allocate low-income housing), and/or sentencing/parole-related decisions 619.

Figure 7:
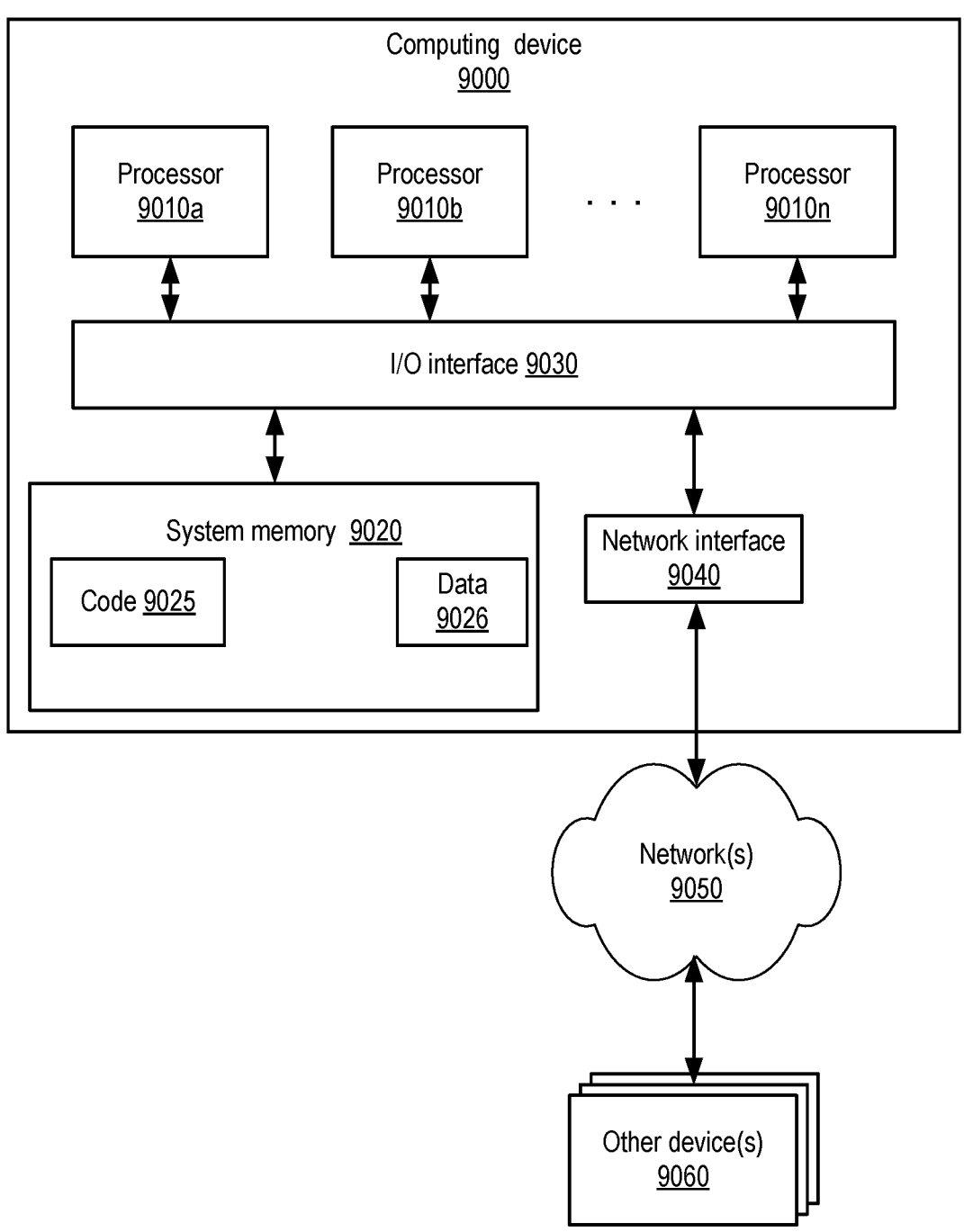
FIG. 7 is a block diagram illustrating an example computing device that may be used in at least some embodiments.

In at least some embodiments, a server that implements a portion or all of one or more of the technologies described herein, including the KDE-IS algorithm and other fairness analysis algorithms, as well as the components of an analytics service similar to that shown in FIG. 1 or decision-making tools such as those shown in FIG. 4 may include a general-purpose computer system that includes or is configured to access one or more computer-accessible media. FIG. 7 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and/or field programmable gate arrays (FPGAs) may be used instead of, or in addition to, conventional processors. NUMA architectures may be used in some embodiments.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 (which may for example comprise the code for various implementations of the KDE-IS algorithm discussed earlier) and data 9026 (which may for example include the data sets on which bias analysis is performed using the enhanced KDE-IS algorithms).

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 6, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 6 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, one or more computer-accessible storage media may comprise instructions that when executed on or across one or more processors implement the techniques described. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Figure 8:
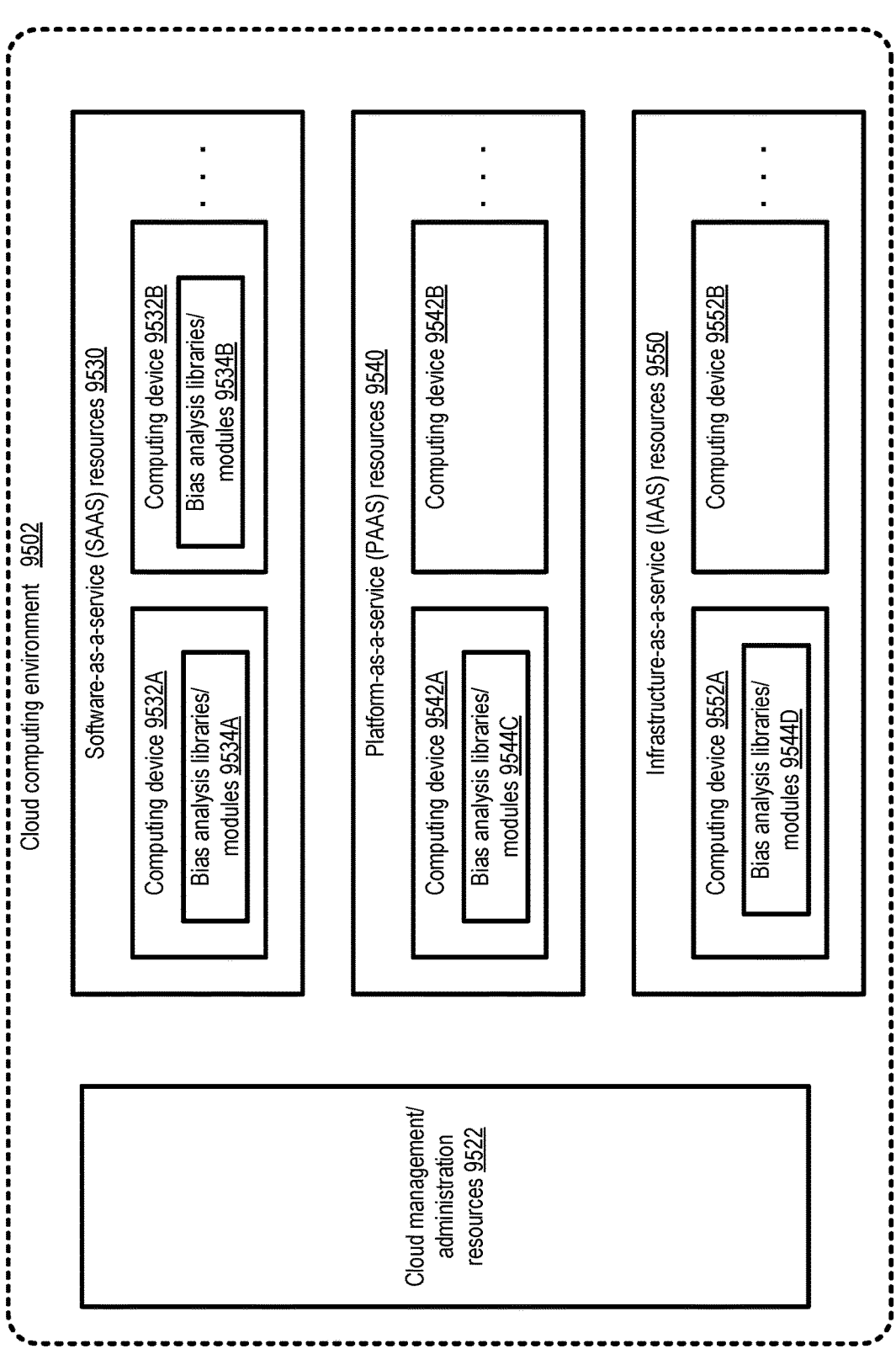
FIG. 8 illustrates an example cloud computing environment in which bias analysis algorithms may be employed, according to at least some embodiments.

FIG. 8 illustrates an example cloud computing environment in which bias analysis algorithms may be employed, according to at least some embodiments. As shown, cloud computing environment 9502 may include cloud management/administration resources 9522, software-as-a-service (SAAS) resources 9530, platform-as-a-service (PAAS) resources 9540 and/or infrastructure-as-a-service (IAAS) resources 9550. Individual ones of the these subcomponents of the cloud computing environment 9502 may include a plurality of computing devices (e.g., devices similar to device 9000 shown in FIG. 7) distributed among one or more data centers in the depicted embodiment, such as devices 9532A, 9532B, 9542A, 9542B, 9552A, and 9552B. A number of different types of network-accessible services, such as an analytics service similar in functionality to service 110 of FIG. 1, database services, customer-relationship management services, and the like may be implemented using the resources of the cloud computing environment in various embodiments.

In the depicted embodiment, clients or customers of the cloud computing environment 9502 may choose the mode in which they wish to utilize one or more of the network-accessible services offered. For example, in the IAAS mode, in some embodiments the cloud computing environment may manage virtualization, servers, storage and networking on behalf of the clients, but the clients may have to manage operating systems, middleware, data, runtimes, and applications. If, for example, a client wishes to use IAAS resources 9550 for some desired application for which similarity analysis techniques of the kind described earlier are used, the clients may identify one or more virtual machines implemented using computing devices 9552 (e.g., 9552A or 95352B) as the platforms on which the applications are being run, and ensure that the appropriate bias analysis libraries/modules 9544D which implement KDE-IS or other similar algorithms are installed/available on those virtual machines. In the PAAS mode, clients may be responsible for managing a smaller subset of the software/hardware stack in various embodiments: e.g., while the clients may still be responsible for application and data management, the cloud environment may manage virtualization, servers, storage, network, operating systems as well as middleware. Bias analysis libraries/modules such as 9544C may be pre-deployed to, and run at, at least some PAAS resources (e.g., 9542A, 9542B etc.) for applications on various clients in different embodiments. In the SAAS mode, the cloud computing environment may offer applications as a pre-packaged service (including the underlying bias analysis libraries/modules such as 9534A or 9534B), managing even more of the software/hardware stack in various embodiments e.g., clients may not even have to explicitly manage applications or data.

The administration resources 9522 may perform resource management-related operations (such as provisioning, network connectivity, ensuring fault tolerance and high availability, and the like) for all the different modes of cloud computing that may be supported in some embodiments. Clients may interact with various portions of the cloud computing environment using a variety of programmatic interfaces in different embodiments, such as a set of APIs (application programming interfaces), web-based consoles, command-line tools, graphical user interfaces and the like. Note that other modes of providing services at which the bias analysis algorithms described earlier are implemented may be supported in at least some embodiments, such as hybrid public-private clouds and the like.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:

training a machine learning model according to a first set of parameters to generate decisions that pertain to a plurality of candidates, wherein individual ones of the candidates belong to one or more classes of a plurality of classes, and wherein the plurality of classes comprises at least some to-be-protected classes;

analyzing a plurality of decisions of a data set generated by the machine learning model to generate a fairness metric, wherein the analyzing comprises at least:

obtaining, using a Hamiltonian Monte Carlo sampling algorithm, a plurality of sets of samples from a plurality of density functions corresponding to at least some random variables of a null model and an alternate model generated with respect to the data set, wherein according to the null model, at least some decisions of the data set meet a fairness criterion with respect to one or more of the to-be-protected classes;

fitting a respective kernel density estimator on at least some sets of the plurality of sets of samples; and performing importance sampling on additional samples obtained from the respective kernel density estimators;

providing, via one or more programmatic interfaces, the fairness metric;

retraining the machine learning model according to a second set of parameters different than the first set of parameters, the retraining performed to reduce or eliminate the bias responsive to determining that the data set comprises bias based at least in part on the fairness metric; and deploying the retrained machine learning model to generate one or more additional decisions, the one or more additional decisions comprising reduced or eliminated bias with respect to the to-be-protected classes.

2. The computer-implemented method as recited in claim 1, wherein the Hamiltonian Monte Carlo sampling algorithm comprises a No-U-Turn sampling algorithm.

3. The computer-implemented method as recited in claim 1, further comprising:

obtaining, via the one or more programmatic interfaces, an indication of the data set.

4. The computer-implemented method as recited in claim 1, further comprising:

obtaining, via the one or more programmatic interfaces, an indication of the fairness criterion.

5. The computer-implemented method as recited in claim 1, wherein the retraining comprises modifying one or more hyperparameters of the machine learning model used for at least some decisions indicated in the data set.

6. The computer-implemented method as recited in claim 1, further comprising:

obtaining, via the one or more programmatic interfaces, an indication of one or more categories of fairness for which the plurality of decisions are to be analyzed.

7. The computer-implemented method as recited in claim 6, wherein the one or more categories of fairness comprise one or more of: (a) equality of odds, (b) gerrymandering, or (c) demographic parity.

8. A system, comprising:

one or more computing devices;

wherein the one or more computing devices include instructions that upon execution on or across the one or more computing devices cause the one or more computing devices to implement a machine learning trainer configured to:

train a machine learning model according to a first set of parameters to generate decisions that pertain to a plurality of candidates, wherein individual ones of the candidates belong to one or more classes of a plurality of classes, wherein the plurality of classes includes at least some to-be-protected classes;

analyze a plurality of decisions of a data set generated by the machine learning model to generate a fairness metric, wherein to analyze the plurality of decisions the one or more computer devices are configured to:

obtain, using a Hamiltonian Monte Carlo sampling algorithm, a plurality of sets of samples from a plurality of density functions corresponding to at least some random variables of a null model and an alternate model generated with respect to the data set, wherein according to the null model, at least some decisions of the data set meet a fairness criterion with respect to one or more of the to-be-protected classes;

fit a respective kernel density estimator on at least some sets of the plurality of sets of samples; and perform importance sampling on additional samples obtained from the respective kernel density estimators;

provide, via one or more programmatic interfaces, the fairness metric;

retrain the machine learning model according to a second set of parameters different than the first set of parameters, the retraining performed to reduce or eliminate the bias responsive to determining that the data set comprises bias based at least in part on the fairness metric; and deploy the retrained machine learning model to generate one or more additional decisions, the one or more additional decisions comprising reduced or eliminated bias with respect to the to-be-protected classes.

9. The system as recited in claim 8, wherein a kernel density estimator fitted to a set of samples of the plurality of sets of samples comprises a Gaussian kernel density estimator.

10. The system as recited in claim 8, wherein the one or more computing devices include further instructions that upon execution on or across the one or more computing devices further cause the one or more computing devices to:

obtain, via the one or more programmatic interfaces, an indication of at least some classes of the plurality of classes.

11. The system as recited in claim 8, wherein the one or more computing devices include further instructions that upon execution on or across the one or more computing devices further cause the one or more computing devices to:

obtain, via the one or more programmatic interfaces, a program to be used to generate at least one random variable of one or more of: (a) the null model or (b) the alternate model.

12. The system as recited in claim 8, wherein the retraining comprises modifying one or more hyperparameters of the machine learning model used for at least some decisions indicated in the data set.

13. The system as recited in claim 8, wherein at least one class of the plurality of classes indicates one or more of: (a) an ethnicity of a candidate, (b) an age group of a candidate, (c) a gender of a candidate or (d) an income group of a candidate.

14. The system as recited in claim 8, wherein the one or more computing devices include further instructions that upon execution on or across the one or more computing devices further cause the one or more computing devices to:

determine one or more parameters of a statistical distribution of at least one random variable of the alternate model based at least in part on a category of fairness for which the data set is to be analyzed.

15. One or more non-transitory computer-accessible storage media storing program instructions that when executed on or across one or more processors cause the one or more processors to:

train a machine learning model according to a first set of parameters to generate decisions that pertain to a plurality of candidates, wherein individual ones of the candidates belong to one or more classes of a plurality of classes, wherein the plurality of classes includes at least some to-be-protected classes;

analyze a plurality of decisions of a data set generated by the machine learning model to generate a fairness metric, wherein to analyze the plurality of decisions the program instructions that when executed on or across the one or more processors cause the one or more processors to:

obtain, using a Hamiltonian Monte Carlo sampling algorithm, a plurality of sets of samples from a plurality of density functions corresponding to at least some random variables of a null model and an alternate model generated with respect to the data set, wherein according to the null model, at least some decisions of the data set meet a fairness criterion with respect to one or more of the to-be-protected classes;

fit a respective kernel density estimator on at least some sets of the plurality of sets of samples; and perform importance sampling on additional samples obtained from the respective kernel density estimators;

provide, via one or more programmatic interfaces, the fairness metric;

retrain the machine learning model according to a second set of parameters different than the first set of parameters, the retraining performed to reduce or eliminate the bias responsive to determining that the data set comprises bias based at least in part on the fairness metric; and deploy the retrained machine learning model to generate one or more additional decisions, the one or more additional decisions comprising reduced or eliminated bias with respect to the to-be-protected classes.

16. The one or more non-transitory computer-accessible storage media as recited in claim 15, wherein the Hamiltonian Monte Carlo sampling algorithm comprises a No-U-Turn sampling algorithm.

17. The one or more non-transitory computer-accessible storage media as recited in claim 15, wherein the respective kernel density estimator comprises a Gaussian kernel density estimator.

18. The one or more non-transitory computer-accessible storage media as recited in claim 15, wherein the fairness criterion is defined with respect to one or more of: (a) demographic parity, (b) equality of odds or (c) gerrymandering.

19. The one or more non-transitory computer-accessible storage media as recited in claim 15, wherein a decision of the plurality of decisions comprises one or more of: (a) a hiring decision, (b) a promotion decision, (c) an educational institution acceptance decision, (d) a social institution membership decision, (e) a financial decision, (f) a resource allocation decision or (a) a sentencing-related decision.

20. The one or more non-transitory computer-accessible storage media as recited in claim 15, wherein the fairness metric comprises a Bayes factor.

* * * * *